United States Patent
Guinart et al.

(10) Patent No.: US 10,328,756 B2
(45) Date of Patent: Jun. 25, 2019

(54) MEASUREMENT METHOD AND UNIT FOR A MOTOR VEHICLE

(71) Applicants: CONTINENTAL AUTOMOTIVE FRANCE, Toulouse (FR); CONTINENTAL AUTOMOTIVE GmbH, Hannover (DE)

(72) Inventors: Nicolas Guinart, Toulouse (FR); Christian Niggel, Pibrac (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 280 days.

(21) Appl. No.: 15/270,794

(22) Filed: Sep. 20, 2016

(65) Prior Publication Data

US 2017/0080762 A1 Mar. 23, 2017

(30) Foreign Application Priority Data

Sep. 22, 2015 (FR) ...................................... 15 58932

(51) Int. Cl.
*B60C 23/20* (2006.01)
*B60C 23/04* (2006.01)

(52) U.S. Cl.
CPC .......... *B60C 23/20* (2013.01); *B60C 23/0408* (2013.01); *B60C 23/0476* (2013.01)

(58) Field of Classification Search
None
See application file for complete search history.

(56) References Cited

U.S. PATENT DOCUMENTS

| 6,907,776 B2* | 6/2005 | Fischer | B60C 23/0408 340/440 |
| 7,242,285 B2* | 7/2007 | Shaw | B60C 23/0408 116/34 R |

(Continued)

FOREIGN PATENT DOCUMENTS

| CN | 202029654 | 11/2011 |
| CN | 203381580 | 1/2014 |

(Continued)

OTHER PUBLICATIONS

FR Search Report, dated May 11, 2016, from corresponding FR application.

*Primary Examiner* — Peter J Macchiarolo
*Assistant Examiner* — Jermaine L Jenkins
(74) *Attorney, Agent, or Firm* — Young & Thompson

(57) ABSTRACT

A method for detecting a displacement of a motor vehicle including a plurality of wheels each including a tire inflated by inflation gases, includes the steps of:
  periodically measuring (E1), at a standby frequency, the temperature of the inflation gases of the tire,
  comparing (E2) the values measured over a predetermined time interval for detecting movement of the vehicle,
  detecting (E3) a movement of the vehicle when the temperature of the inflation gases of the tire increases by at least a first predetermined temperature value during the predetermined time interval for detecting movement of the vehicle, and
  periodically measuring (E4), at an activation frequency higher than the standby frequency, the temperature of the inflation gases of the tire when a movement of the vehicle has been detected.

14 Claims, 4 Drawing Sheets

(56) References Cited

U.S. PATENT DOCUMENTS

| | | | | |
|---|---|---|---|---|
| 7,661,299 B2* | 2/2010 | Kusunoki | ............ | B60C 23/0408 340/442 |
| 8,063,756 B2* | 11/2011 | Watabe | ............... | B60C 23/0488 116/34 R |
| 8,126,608 B2* | 2/2012 | Vassilieff | ................. | H04Q 9/00 340/442 |
| 9,019,094 B2* | 4/2015 | Schwab | ............. | B60C 23/0457 340/445 |
| 10,086,663 B2* | 10/2018 | Shin | ..................... | B60C 23/0457 |
| 2002/0075146 A1* | 6/2002 | Saheki | ................. | B60C 23/0408 340/447 |
| 2004/0044450 A1 | 3/2004 | Taguchi et al. | | |
| 2005/0229691 A1 | 10/2005 | Shaw et al. | | |
| 2007/0279188 A1 | 12/2007 | Thiesen et al. | | |
| 2008/0030314 A1 | 2/2008 | Watabe | | |
| 2008/0062004 A1* | 3/2008 | Hammerschmidt | ......................... | B60C 23/0408 340/870.01 |
| 2009/0045930 A1 | 2/2009 | Fu | | |
| 2012/0154242 A1 | 6/2012 | Nakatani | | |
| 2014/0372006 A1 | 12/2014 | Hammerschmidt | | |

FOREIGN PATENT DOCUMENTS

| | | |
|---|---|---|
| DE | 10 2004 010665 A1 | 9/2005 |
| DE | 10 2014 108 478 | 12/2014 |
| EP | 1 338 446 A1 | 9/2005 |
| WO | 2006/131078 | 12/2006 |

* cited by examiner

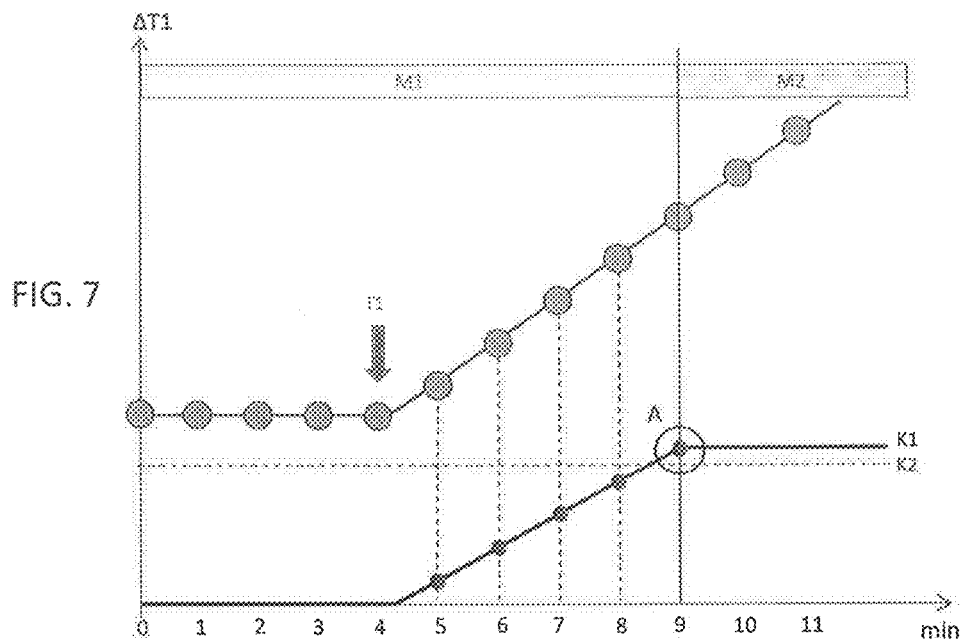
FIG. 7
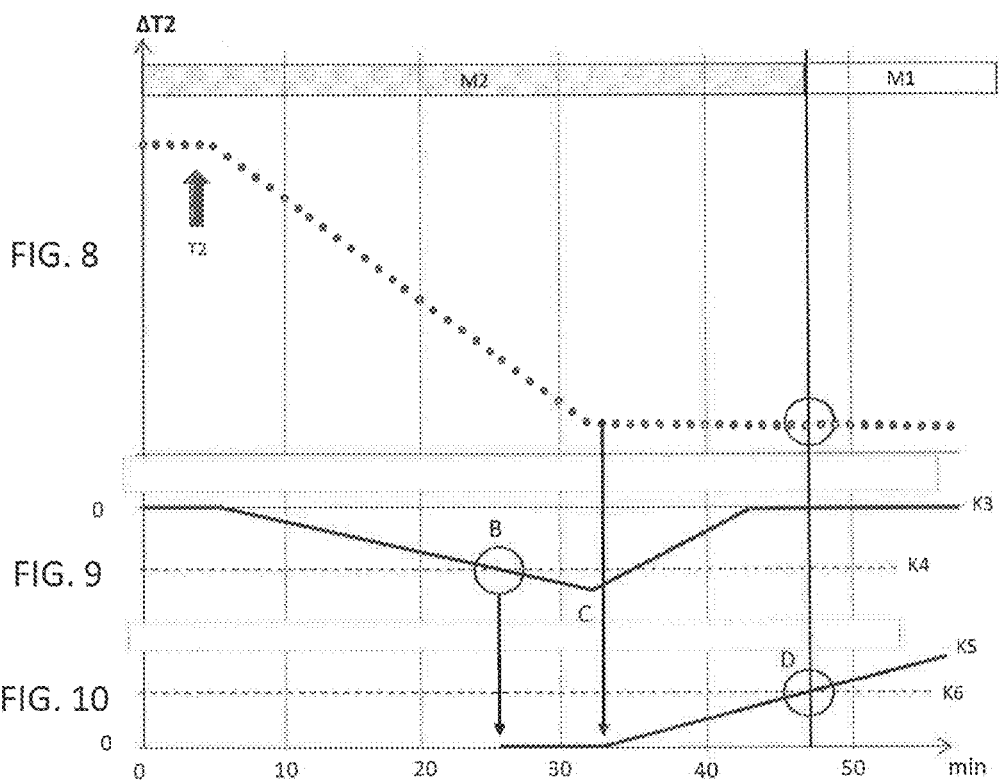
FIG. 8
FIG. 9
FIG. 10

MEASUREMENT METHOD AND UNIT FOR A MOTOR VEHICLE

FIELD OF THE INVENTION

The invention relates to the field of electronic motor vehicle wheel sensors and relates more particularly to a method and unit for detecting movement of the vehicle and a unit for detecting the stopping of the vehicle from the temperature of the inflation gases of a tire.

BACKGROUND OF THE INVENTION

These days, it known practice to mount, in each wheel of a motor vehicle, for example on the valve or on the internal face of the tire, a unit for measuring one or more parameters concerning the inflation gases of said tire such as, for example, the temperature and/or the pressure thereof.

As is known, a measurement unit of an existing solution comprises a temperature measurement sensor, a pressure measurement sensor, a microcontroller, a battery supplying electrical energy, an accelerometer and means for communicating wirelessly with an electronic control unit of the vehicle.

In order to save the supply battery, the measurement unit operates in two different modes: a standby mode and an active mode. In the standby mode, corresponding to the stopping of the vehicle, the microcontroller measures, via the different sensors, the parameters of temperature and of pressure of the inflation gases of the tires and of acceleration of the wheels at a low, so-called "standby" frequency, for example every minute, and analyzes them without sending them to the electronic control unit in order to save the electrical energy supplying the measurement unit. The measurement unit remains in standby mode as long as the vehicle is stopped, that is to say as long as the measured acceleration of the wheels is zero. On the other hand, when the vehicle starts moving and the acceleration becomes non-zero, the measurement unit switches to active mode. In this active mode, the microcontroller measures the parameters of temperature and of pressure of the inflation gases of the tires and of acceleration of the wheels at a high frequency, for example every 16 seconds, and sends them, via the wireless communication means, to the electronic control unit at a report frequency, for example every minute. The electronic control unit analyzes these measurements, notably the pressure of the inflation gases of the tires, in order to detect a tire inflation fault when using the vehicle and inform the driver thereof.

The use of an accelerometer dedicated to detecting the movement of wheels does however significantly increase the complexity and the cost of the measurement unit.

SUMMARY OF THE INVENTION

The aim of the invention is therefore to solve at least some of these drawbacks by proposing a solution that is at the same time simple, effective and inexpensive for a measurement unit for detecting a displacement or stopping of a motor vehicle.

To this end, the subject of the invention is first of all a method for detecting a displacement of a motor vehicle, said vehicle comprising a plurality of wheels each comprising a tire inflated by inflation gases, said method comprising the steps of:

periodically measuring, at a standby frequency, the temperature of the inflation gases of said tire, comparing the values measured over a predetermined time interval for detecting movement of the vehicle, detecting a movement of the vehicle when the temperature of the inflation gases of the tire increases by at least a first predetermined temperature value during said predetermined time interval for detecting movement of the vehicle, periodically measuring, at an activation frequency higher than the standby frequency, the temperature of the inflation gases of the tire when a movement of the vehicle has been detected.

In effect, when running, the temperature of the inflation gases of the tires will increase because of the mechanical and thermal stresses to which the tire and the rim are subjected. The method according to the invention therefore makes it possible to detect a displacement of the vehicle by analyzing the variation of the temperature of the inflation gases of one or more wheels, preferably of all the wheels.

This analysis is performed over a time interval for detecting movement which can, for example, be of the order of a few minutes, for example ten minutes. In effect, the temperature of the inflation gases will increase significantly by a few degrees, for example 5° C. when the vehicle runs for 10 minutes at more than 30 km/h.

It goes without saying that this time interval for detecting movement cannot be too long, for example several hours, otherwise a movement of the vehicle could be detected when the vehicle is, for example, parked in the sun or in proximity to a heat source which would increase the temperature of the inflation gases.

Preferably, the method further comprises, in parallel with the step of periodic measurement at the activation frequency, a step of sending of the measured values to an electronic control unit of the vehicle.

Even more preferably, the method further comprises the steps, performed by the electronic control unit, of reception of the values sent, of analysis of the values received and of warning of an inflation pressure fault on one or more wheels when a fault has been detected from the values analyzed.

The invention relates also to a method for detecting a stopping of a motor vehicle, said vehicle comprising a plurality of wheels each comprising a tire inflated by inflation gases, said method comprising the steps of:

periodically measuring, at an activation frequency, the temperature of the inflation gases of said tire, comparing the values measured over a predetermined time interval for detecting stopping of the vehicle, detecting a stopping of the vehicle when the temperature of the inflation gases of the tire decreases by at least a second predetermined temperature value then stabilizes during said predetermined time interval for detecting stopping of the vehicle, periodically measuring, at a standby frequency lower than the activation frequency, the temperature of the inflation gases of the tire when a stopping of the vehicle has been detected.

The term "stabilizes" should be understood to mean that the temperature remains within a limited temperature interval, for example 1° C. wide, during a sub-interval of the predetermined time interval for detecting stopping of the vehicle, for example 45 min.

This method makes it possible to detect the stopping of the vehicle when a significant fall then a stabilization of the temperature of the inflation gases is observed over a time interval for detecting stopping. This time interval for detecting stopping is longer than the time interval for detecting movement. In effect, the temperature of the inflation gases will decrease slowly when the vehicle stops moving. As an example, by considering a tire cooling gradient of the order of −0.35° C./min, or approximately −21° C./hour, the time interval for detecting stopping can, for example, lie between 15 minutes and 1 hour depending on the outside temperature.

Preferably, the negative temperature variation is measured over a sliding window of ten minutes with an evaluation every minute until a predetermined low threshold value is reached.

The invention relates also to a method for detecting a displacement or a stopping of a motor vehicle, said vehicle comprising a plurality of wheels each comprising a tire inflated by inflation gases, said method comprising the steps of:
- periodically measuring, at a first predetermined frequency, the temperature of the inflation gases of said tire,
- comparing the values measured over a predetermined detection time interval,
- detecting a movement or a stopping of the vehicle when the temperature of the inflation gases of the tire varies by at least a predetermined temperature deviation during said detection time interval,
- periodically measuring, at a second predetermined frequency, the temperature of the inflation gases of the tire when a movement or a stopping of the vehicle has been detected.

According to one aspect of the invention, the first frequency is a standby frequency and the second frequency is an activation frequency higher than the standby frequency, in case of detected movement.

According to another aspect of the invention, the first frequency is an activation frequency and the second frequency is a standby frequency lower than the activation frequency, in case of detected stopping.

Advantageously, a movement of the vehicle is detected when the temperature of the inflation gases of the tire increases by at least a first predetermined temperature value during said predetermined time interval for detecting movement of the vehicle and a stopping of the vehicle is detected when the temperature of the inflation gases of the tire decreases by at least a second predetermined temperature value then stabilizes during said detection time interval.

The invention relates also to a measurement unit for detecting a movement of a motor vehicle, intended to be mounted in a wheel of said vehicle, said wheel comprising a tire inflated by inflation gases, said measurement unit being configured to:
- periodically receive, at a standby frequency, measurements of the temperature of the inflation gases of said tire of the vehicle,
- compare the measurements received over a predetermined time interval for detecting movement of the vehicle,
- detect a movement of the vehicle when the temperature of the inflation gases of the tire increases by at least a first predetermined temperature value during said predetermined time interval for detecting movement of the vehicle,
- send a command to periodically measure, at an activation frequency higher than the standby frequency, the temperature of the inflation gases of the tire when a movement of the vehicle has been detected.

The invention relates also to a measurement unit for detecting a stopping of a motor vehicle, intended to be mounted in a wheel of said vehicle, said wheel comprising a tire inflated by inflation gases, said measurement unit being configured to:
- periodically receive, at an activation frequency, measurements of the temperature of the inflation gases of said tire of the vehicle,
- compare the measurements received over a predetermined time interval for detecting stopping of the vehicle,
- detect a stopping of the vehicle when the temperature of the inflation gases of the tire decreases by at least a second predetermined temperature value then stabilizes during said predetermined time interval for detecting stopping of the vehicle,
- send a command to periodically measure, at a standby frequency lower than the activation frequency, the temperature of the inflation gases of the tire when a stopping of the vehicle has been detected.

The invention relates also to a measurement device intended to be mounted in a wheel of a motor vehicle comprising a unit for detecting a movement of said motor vehicle as described previously and a measurement unit for detecting a stopping of said motor vehicle as described previously.

In this case, preferably, the measurement unit for detecting a movement of a motor vehicle and the measurement unit for detecting a stopping of a motor vehicle thus form one and the same entity.

The invention relates also to a wheel of a motor vehicle wheel comprising a measurement unit for detecting a movement of said motor vehicle or a measurement unit for detecting a stopping of said motor vehicle as described previously or a measurement device as described previously.

The invention relates also to a motor vehicle comprising at least one wheel as described previously.

BRIEF DESCRIPTION OF THE DRAWINGS

Other features and advantages of the invention will become apparent from the following description, given in light of the attached figures given as non-limiting examples and in which identical references are given to similar objects.

FIG. 7 is an example of detection of movement of a vehicle from an increase in the temperature of the inflation gases of its tires beyond a predetermined threshold over a detection time interval of five minutes.

FIG. 8 represents a decrease in the temperature of the inflation gases of the tires of a motor vehicle following a stopping of said vehicle.

FIG. 9 represents the average rate of variation of the temperature of the inflation gases of the tires of a motor vehicle following a stopping of said vehicle.

FIG. 10 represents an example of stabilization of the temperature of the inflation gases of the tires of a motor vehicle following a stopping of said vehicle.

DETAILED DESCRIPTION OF THE INVENTION

The invention makes it possible, simply and inexpensively, to determine whether a motor vehicle is moving or stopped in order to detect an inflation problem on a wheel of the vehicle and in particular detect it quickly when the vehicle is moving so as to be able to warn the driver thereof.

This determination is made from the inflation temperature of the tires which increases when the vehicle is running then decreases when the vehicle stops after having been running.

Figure 1:
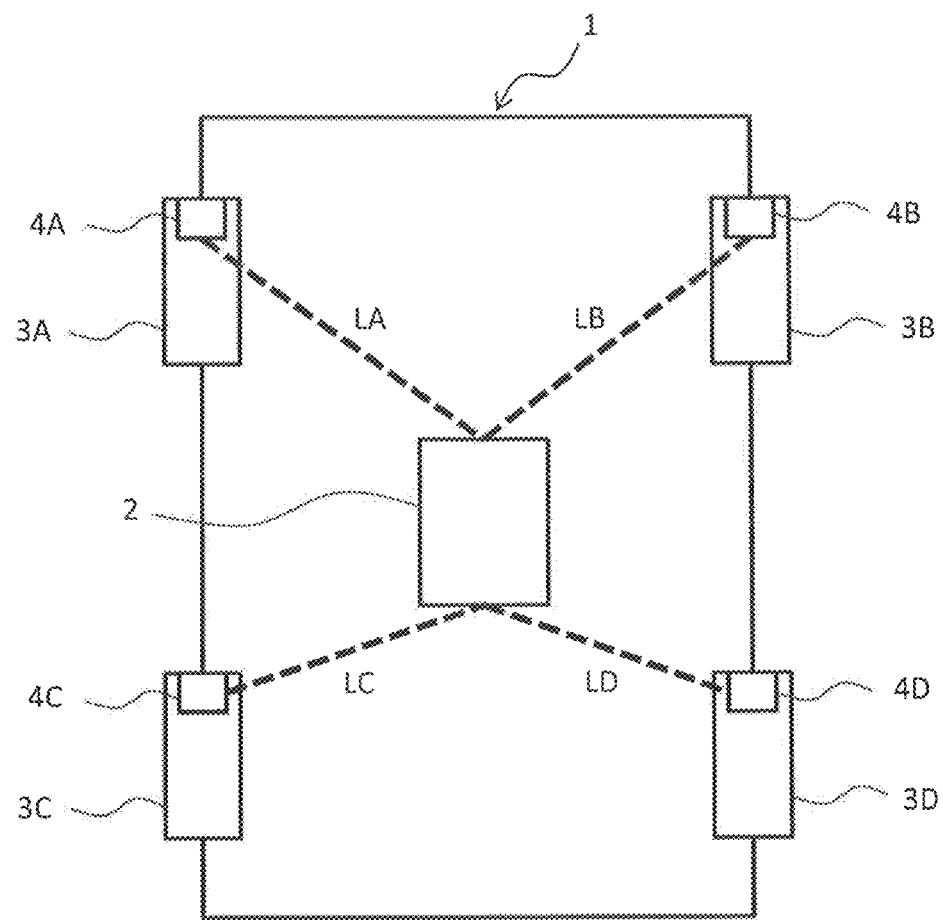
FIG. 1 schematically represents a motor vehicle comprising a plurality of wheels each comprising a measurement unit according to the invention.

To this end, referring to FIG. 1, the vehicle 1 comprises an electronic control unit (ECU) 2 of computer type and four wheels, respectively 3A, 3B, 3C and 3D, in each of which is mounted a measurement unit, respectively 4A, 4B, 4C and 4D.

Figure 2:
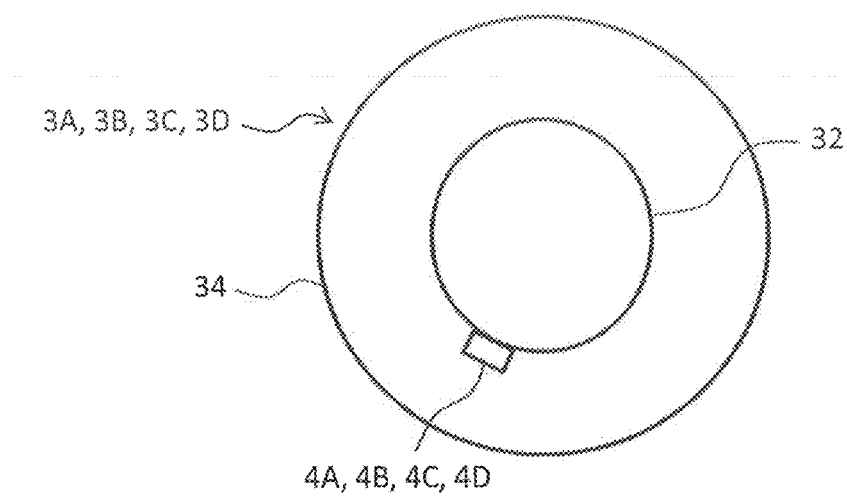
FIG. 2 schematically represents a motor vehicle wheel comprising a measurement unit according to the invention mounted on the valve of the rim of the wheel.
Figure 3:
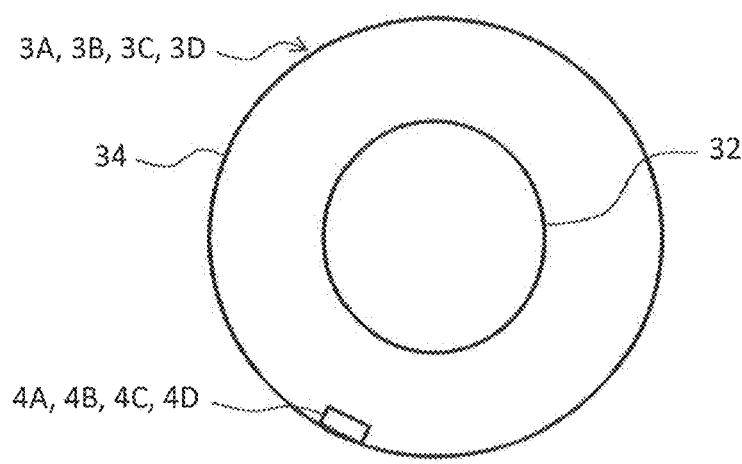
FIG. 3 schematically represents a motor vehicle wheel comprising a measurement unit according to the invention mounted on the inside of the tire of the wheel.

Referring to FIGS. 2 and 3, a wheel 3A, 3B, 3C and 3D of a motor vehicle 1 comprises, as is known, a rim 32 on which is mounted a tire 34 delimiting a space for receiving inflation gases of the tire.

The measurement unit 4A, 4B, 4C and 4D can be mounted in different ways.

Thus, in the example of FIG. 2, the measurement unit 4A, 4B, 4C and 4D is mounted on the valve of the wheel 3A, 3B, 3C and 3D and, in the example of FIG. 3, the measurement unit 4A, 4B, 4C and 4D is glued onto the internal surface of the tire 34.

Figure 4:
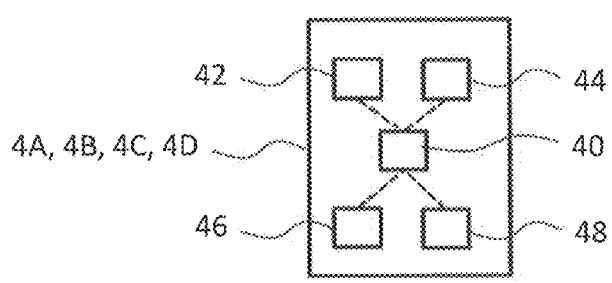
FIG. 4 schematically represents a measurement unit according to the invention.

In a preferred embodiment illustrated in FIG. 4, the measurement unit 4A, 4B, 4C and 4D comprises a microcontroller 40, a sensor 42 for measuring the temperature of the inflation gases, a sensor 44 for measuring the pressure of the inflation gases, means 46 for communicating wirelessly with the electronic control unit 2 and a battery 48 supplying electrical energy for said microcontroller 40.

The microcontroller 40 is configured to, on the one hand, collect the measurements made by the temperature measurement sensor 42 and by the pressure measurement sensor 44 and, on the other hand, send said measurements to the electronic control unit 2 via the wireless communication means 46 over a wireless communication link, respectively LA, LB, LC, LD in FIG. 1.

The wireless communication means 46 can be based on a communication of ZigBee, Wi-Fi or Bluetooth type known to those skilled in the art. Such a measurement unit 4A, 4B, 4C and 4D is simple and inexpensive in that it is not necessary for it to include an accelerometer to detect a movement or a stopping of the vehicle 1.

In normal operation of the vehicle 1, each wheel 3A, 3B, 3C and 3D must be inflated to a pressure lying within a predetermined inflation interval.

Thus, an inflation fault is detected on a wheel 3A, 3B, 3C and 3D by the electronic control unit 2 when the pressure of the inflation gases of the tire 34 of the wheel 3A, 3B, 3C and 3D does not lie within said predetermined inflation interval.

To this end and according to the invention, the microcontroller 40 of the measurement unit 4A, 4B, 4C and 4D is first of all configured to periodically collect measurements of the temperature and of the pressure of the inflation gases of the tire 34 and to send these measurements, via the wireless communication means 46, over the associated communication link LA, LB, LC, LD, to the electronic control unit 2 when the displacement of the vehicle 1 has been detected.

The microcontroller 40 is then configured to run a comparison between the measurement values collected over a predetermined time interval for detecting movement of the vehicle 1 so as to detect a movement of the wheels 3A, 3B, 3C and 3D and therefore of the vehicle 1 when the temperature of the inflation gases of the tire 34 increases by a predetermined temperature value during said predetermined time interval for detecting movement of the vehicle 1. In other words, the microcontroller 40 detects a movement of the vehicle 1 when the temperature varies positively at least by a predetermined deviation during the time interval for detecting movement.

The microcontroller 40 is further configured to run a comparison between the measurement values collected over a predetermined time interval for detecting stopping of the vehicle 1 so as to detect a stopping of the wheels 3A, 3B, 3C and 3D and therefore of the vehicle 1 when the temperature of the inflation gases of the tire 34 decreases by a predetermined temperature value then stabilizes during said predetermined time interval for detecting stopping of the vehicle 1. In other words, the microcontroller 40 detects a stopping of the vehicle 1 when the temperature varies negatively at least by a predetermined deviation during the time interval for detecting stopping.

The frequency with which the measurements are collected varies according to the mode of operation of the measurement unit 4A, 4B, 4C and 4D. Thus, in a so-called "standby" mode, corresponding to the case where the vehicle 1 is stopped, the microcontroller 40 collects the temperature and pressure measurements at a so-called "standby" frequency, for example every minute, but does not send these measurements to the electronic control unit 2 in order to save the energy of the power supply battery 48. In effect, since the vehicle 1 is stopped, there is no need to inform a driver of the vehicle 1 of a problem of inflation of a wheel 3A, 3B, 3C and 3D.

In a so-called "active" mode, the microcontroller 40 collects the temperature and pressure measurements at a so-called "active" frequency higher than the standby frequency and sends these measurements to the electronic control unit 2, via the wireless communication means 46 over the associated communication link LA, LB, LC, LD, in order for the electronic control unit 2 to analyze them and ultimately inform the driver of an inflation pressure fault on one or more wheels 3A, 3B, 3C and 3D.

The electronic control unit 2 is therefore configured to receive the temperature measurements sent by the measurement units 4A, 4B, 4C and 4D over the communication links LA, LB, LC, LD, to analyze the measurements received and to inform the driver of any inflation fault identified during this analysis.

The invention will now be described in its implementation with reference notably to FIGS. 5 to 10.

Since the vehicle is stopped, the measurement unit 4A, 4B, 4C, 4D is operating in standby mode M1 as illustrated in FIG. 7.

Figure 5:
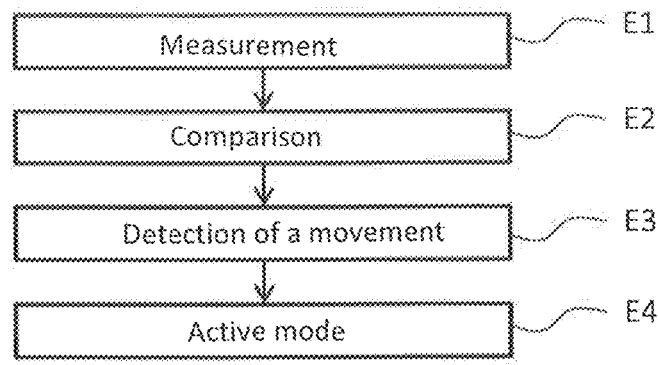
FIG. 5 schematically represents an embodiment of a first method according to the invention.

Referring to FIG. 5, the temperature measurement sensor 42 and the pressure measurement sensor 44 of each measurement unit 4A, 4B, 4C, 4D periodically measure, at the standby frequency, for example every minute, in a step E1, the temperature and the pressure of the inflation gases of the corresponding tire 34. These measurements are collected and stored by the microcontroller 40.

In parallel, in a step E2, the microcontroller 40 compares the temperature values measured during a predetermined time interval for detecting movement of the vehicle, for example 10 minutes.

A movement of the vehicle 1 is detected, in a step E3, when the temperature of the inflation gases of the tires 34 increases by at least a first predetermined temperature value, for example 5° C., during the predetermined time interval for detecting movement of the vehicle 1. Thus, for example, when the vehicle 1 is stopped for a long time, for example several hours, the temperature of the inflation gases of the tires is stable or varies little and slowly (interval from 0 to 4 minutes in FIG. 7), for example of the order of the ambient temperature outside the vehicle 1.

On the other hand, when the vehicle 1 starts running, the temperature of the inflation gases increases rapidly (interval from 4 to 11 minutes in FIG. 7).

Thus, as soon as the temperature of the inflation gases of the tires increases at the instant T1 as illustrated in FIG. 7, this temperature is monitored, for example every minute, until it reaches a value K1 higher than a movement threshold K2 and it is deduced therefrom that the vehicle 1 has started moving (point A). By way of example, an increase of 5° C. in the temperature of the inflation gases over an interval of 10 min, measured every minute, corresponds to a heating which reflects a movement of the vehicle 1.

The microcontroller 40 then switches from the standby mode M1 to the active mode M2 in a step E4.

Figure 6:
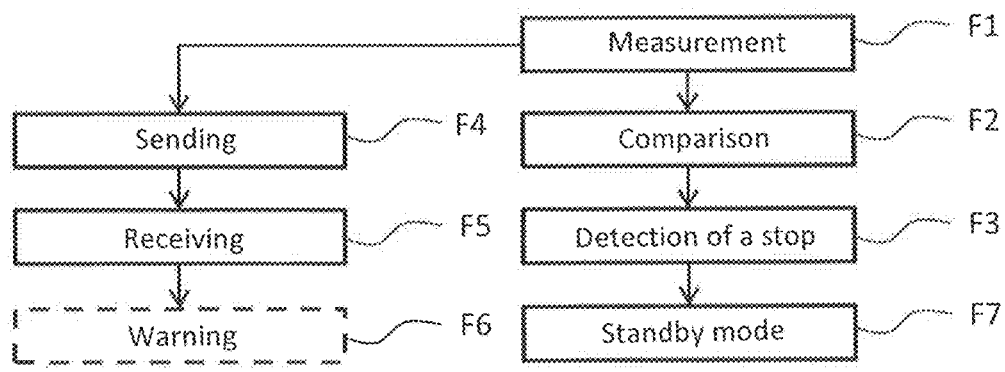
FIG. 6 schematically represents an embodiment of a second method according to the invention.

In this active mode M2, referring now to FIG. 6, the microcontroller 40 periodically measures, at the activation frequency, for example every 16 seconds, the temperature and the pressure of the inflation gases of the tires 34 in a step F1.

In parallel, the microcontroller 40 compares, in a step F2, the temperature values measured during a predetermined time interval for detecting stopping of the vehicle, for example 10 minutes.

A stopping of the vehicle 1 is detected by the microcontroller 40, in a step F3, when the temperature of the inflation gases of the tires decreases at least by a second predetermined temperature value, for example 5° C., then stabilizes during the predetermined time interval for detecting stopping of the vehicle 1. The stabilization of the temperature can be observed when the temperature varies by less than 1° C. during a sub-interval of the time interval for detecting stopping, for example at least 30 minutes. In another example, the predetermined time interval for detecting stopping of the vehicle 1 can be spread over one hour with a cooling period of the tires 34 of forty-five minutes during which the negative temperature variation is measured over a sliding window of ten minutes with an assessment every minute until a low threshold value is reached, for example correlated to the ambient temperature of the air, followed by a stabilization period of fifteen minutes during which the temperature varies little and slowly, for example by a few tenths of degrees.

In the example in FIG. 8, when the vehicle 1 is stopped, the temperature begins to decrease at the instant T2 and, referring to FIG. 9, the temperature then varies negatively first of all rapidly then more slowly before stabilizing (zero rate of variation) as illustrated by the curve K3.

Referring to FIG. 10, when the temperature drops rapidly and crosses a rate-of-drop threshold K4 (point B), a counter K5, which starts when the rate of drop of the temperature slows down (point C), is then initialized.

It is then considered that a stopping of the vehicle 1 is detected when this counter K5 exceeds a stabilization threshold K6, the vehicle 1 then switching from the active mode M2 to the standby mode M1.

In parallel, as long as the measurement unit 4A, 4B, 4C, 4D is in active mode M2, the microcontroller 40 sends, via the wireless communication means 46, over an associated communication link LA, LB, LC, LD, at least the collected pressure measurements to the electronic control unit 2 in a step F4, for example every minute.

The electronic control unit 2 receives, in a step F5, these pressure measurements and analyzes them, in a step F6, in order to detect an inflation fault on one or more wheels 3A, 3B, 3C, 3D, when the corresponding pressure is below a pressure threshold value, and warn the driver of said fault if necessary in a step F7.

Advantageously, provision can be made to send the measurements of temperature and pressure of the inflation gases of the tire 34 to the electronic control unit 2 before attaining the active mode when the temperature of the inflation gases begins to vary, such a transient mode making it possible to cover a typical cases and adding robustness to the method as a whole. The atypical cases are the cases which justify a transient management of the state changes between the moving and stopping of the vehicle 1. As an example, when the vehicle 1 leaves a car park with air conditioning for example set at 20° C. and the outside temperature is 0° C., although the vehicle is moving and the tires will ultimately rise in temperature, the temperature of the inflation gases will first of all drop because of the abrupt ambient temperature difference. Therefore here, it is a matter of sending, over a short period, a few periodic messages, for example two or three, which guarantee the pressure and temperature supervision of the tires 34 by the electronic control unit 2.

Once the stopping is detected in the step F3, the microcontroller 40 reverts to the standby mode in a step F7, in order to save the energy stored in the power supply battery 48.

It should finally be noted that the present invention is not limited to the examples described above and lends itself to numerous variants accessible to those skilled in the art.

The invention claimed is:

1. A method for detecting a displacement of a motor vehicle (1), where said vehicle (1) has a plurality of wheels each having a tire (34) inflated by inflation gases, said method comprising the steps of:
   using an electronic sensor that registers a temperature of the inflation gases of said tire (34), and a microcontroller in communication with the electronic sensor for periodically measuring (E1), via the electronic sensor, and storing the temperature of the inflation gases of said tire (34), to accumulate a plurality of temperature values over a predetermined time interval, the microcontroller operating in a standby mode such that the temperature of the inflation gases of said tire (34) is periodically measured and stored at a standby frequency;
   at the microcontroller, comparing (E2) the temperature values measured over the predetermined time interval to determine whether the temperature of the inflation gases of the tire (34) has increased by at least a first predetermined temperature value during the predetermined time interval;
   at the microcontroller, determining (E3) a state of movement of the vehicle (1) upon a determination that the temperature of the inflation gases of the tire (34) has increased by at least the first predetermined temperature value during the predetermined time interval; and
   at the microcontroller, upon said determining of the state of movement of the vehicle, switching from the standby mode to an active mode, wherein the temperature of the inflation gases of the tire (34) is periodically measured and stored at an activation frequency, the activation frequency being higher than the standby frequency.

2. The method as claimed in claim 1, further comprising:
at the microcontroller and in parallel with the step of periodic measurement at the activation frequency, sending (F6) the measured temperature values to an electronic control unit (2) of the vehicle (1).

3. The method as claimed in claim 2, further comprising:
receiving, at the electronic control unit, the temperature values sent by the microcontroller;
analyzing, at the electronic control unit, the values received; and
at the electronic control unit, generating a warning upon detection, from the values analyzed, of an inflation pressure fault on one or more of the wheels.

4. A method for detecting a stopping of a motor vehicle (1), where said vehicle (1) has a plurality of wheels each having a tire (34) inflated by inflation gases, the method comprising the steps of:
using an electronic sensor that registers a temperature of the inflation gases of said tire (34), and a microcontroller in communication with the electronic sensor for periodically measuring (F1), via the electronic sensor, and storing the temperature of the inflation gases of said tire (34), to accumulate a plurality of temperature values over a predetermined time interval, the microcontroller operating in an active mode such that the temperature of the inflation gases of said tire (34) is periodically measured and stored at an activation frequency;
at the microcontroller, comparing (F2) the temperature values measured over the predetermined time interval to determine whether the temperature of the inflation gases of the tire (34) has decreased by at least a second predetermined temperature value and then stabilizes during the predetermined time interval;
at the microcontroller, determining (F3) a state of stopping of the vehicle (1) upon a determination that the temperature of the inflation gases of the tire has decreased by at least the second predetermined temperature value then stabilizes during the predetermined time interval; and
at the microcontroller, upon said determining of the state of stopping of the vehicle, switching from the active mode to a standby mode, wherein the temperature of the inflation gases of the tire (34) is periodically measured and stored at a standby frequency, the standby frequency being lower than the activation frequency.

5. The method as claimed in claim 4, wherein the second predetermined temperature value is measured over a sliding window of ten minutes with an evaluation every minute until a predetermined low threshold value is reached.

6. A measurement unit to be mounted in a wheel of a motor vehicle (1) for detecting a movement of said vehicle (1), where said wheel includes a tire inflated by inflation gases, said measurement unit being configured to:
periodically receive and store, at a standby frequency corresponding to a standby mode of operation, measurements of the temperature of the inflation gases of said tire (34) of the vehicle (1) such to accumulate a plurality of temperature values over a predetermined time interval;
compare the temperature values received over the predetermined time interval to determine whether the temperature of the inflation gases of the tire (34) has increased by at least a first predetermined temperature value during the predetermined time interval;
determine a state of movement of the vehicle (1) upon a determination that the temperature of the inflation gases of the tire (34) has increased by at least the first predetermined temperature value during the predetermined time interval; and
upon the determining of the state of movement of the vehicle, switching from the standby mode of operation to an active mode of operation, wherein the temperature of the inflation gases of the tire (34) is periodically measured and stored at an activation frequency higher than the standby frequency.

7. A wheel of a motor vehicle (1) comprising a measurement unit as claimed in claim 6.

8. A motor vehicle (1) comprising at least one wheel as claimed in claim 7.

9. A measurement unit to be mounted in a wheel of a motor vehicle (1) for detecting a stopping of said vehicle (1), where said wheel includes a tire inflated by inflation gases, said measurement unit being configured to:
periodically receive and store, at an activation frequency corresponding to an active mode of operation, measurements of the temperature of the inflation gases of said tire (34) of the vehicle (1) such to accumulate a plurality of temperature values over a predetermined time interval;
compare the temperature values received over the predetermined time interval for detecting stopping of the vehicle to determine whether the temperature of the inflation gases of the tire (34) has decreased by at least a second predetermined temperature value then stabilizes during the predetermined time interval;
determine a state of stopping of the vehicle (1) upon a determination that the temperature of the inflation gases of the tire (34) has decreased by at least the second predetermined temperature value then stabilizes during the predetermined time interval; and
upon the determining of the state of stopping of the vehicle, switching from the active mode of operation to a standby mode of operation, wherein the temperature of the inflation gases of the tire (34) is periodically measured and stored at a standby frequency lower than the activation frequency.

10. A wheel of a motor vehicle (1) comprising a measurement unit as claimed in claim 9.

11. A motor vehicle (1) comprising at least one wheel as claimed in claim 10.

12. A measurement device mountable in a wheel of a motor vehicle (1), comprising:
a first measurement unit for detecting a movement of said motor vehicle (1) as claimed in claim 6; and
a second measurement unit for detecting a stopping of said motor vehicle (1),
said second measurement unit being configured to:
periodically receive and store, at an activation frequency, measurements of the temperature of the inflation gases of said tire (34) of the vehicle (1) such to accumulate a plurality of temperature values over a predetermined time interval;
compare the temperature values received over the predetermined time interval for detecting stopping of the vehicle to determine whether the temperature of the inflation gases of the tire (34) has decreased by at least a second predetermined temperature value then stabilizes during the predetermined time interval;

determine a state of stopping of the vehicle (1) upon a determination that the temperature of the inflation gases of the tire (34) has decreased by at least the second predetermined temperature value then stabilizes during the predetermined time interval; and upon the determining of the state of stopping of the vehicle, send a command to periodically measure and store, at a standby frequency lower than the activation frequency, the temperature of the inflation gases of the tire (34).

13. A wheel of a motor vehicle (1) comprising a measurement unit as claimed in claim 12.

14. A motor vehicle (1) comprising at least one wheel as claimed in claim 13.

* * * * *